(12) United States Patent
Bell et al.

(10) Patent No.: US 6,827,961 B1
(45) Date of Patent: Dec. 7, 2004

(54) CHEESE FRACTIONATING PROCESS

(75) Inventors: Lawrence I. Bell, Green Bay, WI (US); Randall L. Brandsma, Green Bay, WI (US)

(73) Assignee: Schreiber Foods, Inc., Green Bay, WI (US)

( * ) Notice: Subject to any disclaimer, the term of this patent is extended or adjusted under 35 U.S.C. 154(b) by 293 days.

(21) Appl. No.: 09/997,392

(22) Filed: Nov. 28, 2001

Related U.S. Application Data

(60) Provisional application No. 60/307,252, filed on Jul. 23, 2001.

(51) Int. Cl.$^7$ ............................................. A23C 19/00
(52) U.S. Cl. ...................... 426/582; 426/580; 426/478; 426/491
(58) Field of Search ................................ 426/580, 582, 426/586, 478, 486, 490, 491, 520

(56) References Cited

U.S. PATENT DOCUMENTS

| | | |
|---|---|---|
| 4,075,355 A | 2/1978 | Pato |
| 4,876,100 A | 10/1989 | Holm et al. |
| 5,017,396 A | 5/1991 | Lehmann et al. |
| 5,037,659 A | 8/1991 | Trecker et al. |
| 5,098,729 A | 3/1992 | Engel |
| 5,330,780 A | 7/1994 | Yee et al. |
| 5,356,639 A | 10/1994 | Jameson et al. |
| 5,356,640 A | 10/1994 | Jameson et al. |
| 5,532,018 A | 7/1996 | Miller et al. |
| 5,683,733 A | 11/1997 | Krabsen et al. |
| 5,709,900 A | 1/1998 | Miller et al. |
| 6,051,268 A | 4/2000 | Mahmoud et al. |
| 2003/0096043 A1 | 5/2003 | Barbano |

OTHER PUBLICATIONS

B.K. Nelson, et al., "Reduced Fat Cheddar Cheese Manufactured Using a Novel Fat Removal Process," Journal of Dairy Science, pp 841–853; vol. 87, 2004, American Dairy Science Association.

B.K. Nelson, et al., copies of slide presentation: "Reduced fat cheese production by fat removal from aged Cheddar cheese," American Dairy Science Assoc. Annual Meeting, Baltimore, MD, Jul. 24–28, 2000.

B.K. Nelson, et al., Abstract: "Reduced fat cheese production by fat removal from aged Cheddar cheese," J. Day Sci., vol. 83, Suppl. Jan. 2000.

*Primary Examiner*—Leslie Wong
(74) *Attorney, Agent, or Firm*—Brinks Hofer Gilson & Lione

(57) ABSTRACT

A method for fractionating or separating a cheese uses heat and mixing of the cheese to separate the cheese into three phases. The three phases include a butterfat phase, an aqueous phase, and a cheese product from which some fat and flavor have been removed. The process may be hastened by adding water, and may be further hastened by using enhanced gravitational forces to effect separation of the portions. The process may also be used to remove undesirable flavor components from the cheese or to make a dairy spread.

40 Claims, 13 Drawing Sheets

Process Flow Chart for Cheese Fractionation

Fat Extraction vs. Temperature

Process Flow Chart for Manufacturing a Sharp Low Fat Cheese and for Extracting a Cheese Flavor Fig. 7 Fractionation Results Process Flow Chart for Cheese with Mild or Bland Flavor Process Flow Chart for Cheese Flavor Extraction From Enzyme Modified Cheese (EMC)

Fig. 10  EMC Fractionation Results

Process Flow Chart for Cheese Fractionation
For Removal of Undesirable flavors

Process Flow Chart for Producing a Cheese-flavored Dairy or Non-Dairy Spread  1300

CHEESE FRACTIONATING PROCESS

This application claims the benefit of the filing date of Provisional Application Ser. No. 60/307,252, filed Jul. 23, 2001, which is hereby incorporated by reference in its entirety.

FIELD OF THE INVENTION

This invention pertains to the field of food processing and in particular to cheese processing. One aspect of the invention relates to a method of manufacturing cheese to lower the amount of fat that remains in the cheese. More specifically, this aspect of the invention relates to a method of breaking the natural emulsion of cheese to release the fat from the cheese matrix, and allow for reduction of the amount of fat in the cheese. In another aspect, the invention also allows for the removal of undesirable flavors in cheese.

BACKGROUND OF THE INVENTION

Consumers enjoy cheeses of all types, but would prefer cheese that has less fat than cheese made by present food-processing techniques. Cheese may be made from whole milk, generally bovine milk having 3–4% milk fat. Cheese may also be made from skim milk, that is, milk from which essentially all the fat has been removed and which has about 0.5% fat or less. Part-skim milk is also used, part-skim milk being milk from which part of the fat has been removed, resulting in milk with 1–2% milk fat. The cheese that is made from milk has a large percentage of fat, typically in the range of 20–40 percent fat. The balance of the cheese is largely moisture (40–50 percent), protein (20–30 percent), and other ingredients that are typically not more than a few percent. Cheese made by an ultrafiltration process may also have more fat than consumers wish.

In order to reduce the fat in cheese, manufacturers typically use milk with less fat as a starting material. Standard cheese processing techniques are thereafter used. A culture is added to the milk, the culture producing lactic acid from the natural lactose in milk. An enzyme may later be added, causing coagulation of the milk. Other ingredients may also be added. Coagulated milk is cut into small pieces or curd at a temperature of about 90° F. After cutting, the curd is allowed to "heal," or form a film on the surface of the pieces of curd. During this time, the curd particles start to shrink and expel whey. The curd and whey mixture is stirred and heated or cooked until a desired acidity and temperature is reached. The whey is then drained from the curd. After whey removal, the curd may be processed as desired for different types of cheese while additional lactic acid is produced by continued fermentation of the lactose. The curd may or may not be washed with water. Different cheeses are then processed as desired, including reaching the desired level of acidity, adding salt, pressing the curd into desired form, and packaging. Cheese made by this process, or by other processes, and from which a portion of the fat has not been removed, is referred to in this application as a full-fat cheese.

Part-skim milk or skim milk is used in making cheese having "reduced fat" (at least 25% less fat than standard cheese), or "light" cheese (at least 50% less fat than standard), or "low-fat" cheese (having less than 3 grams fat per 50 gram serving), definitions according to 21 C.F.R. Sections 101.9 and 161.62, and 21 C.F.R. Section 133. However, when skim milk or part-skim milk is used to make cheese, the resulting cheese may have an undesirable rubbery texture, rather than a firm but pliable texture. The cheese may also have a variety of off-flavors, ranging from bitter to metallic to flat. Processes using skim or part-skim milk also tend to have lower yield. This results in higher cost to the cheese maker and to the consumer. Cheese makers prefer not to make lower fat cheese because the lower yield, higher cost, and poorer quality are economic disincentives. What is needed is a better way to make cheese with reduced fat content.

BRIEF SUMMARY

The present invention provides a method of making cheese with a lowered fat content that overcomes the foregoing problems. One embodiment is a method for processing cheese, the method comprising providing cheese and warming the cheese to at least 130° F. and stirring to form an aqueous phase from the cheese, and also forming a phase of butterfat, and a cheese product. The method then separates the butterfat phase, and also separates the aqueous phase. A cheese product remains, the cheese product having at least a portion of its fat removed, wherein the cheese product is selected from the group consisting of low fat cheese, light cheese, and reduced fat cheese.

Another embodiment of the invention is a cheese product, the cheese product having less fat than the starting cheese. The cheese is a low fat cheese, a light cheese, or a reduced-fat cheese product, made by this process. Cheese flavorings with lower levels of fat are also embodiments.

Another embodiment is a method for removing undesirable flavors in cheese. The method for extracting these undesirable flavors includes providing a cheese, the cheese containing fat and having an undesirable flavor. The method includes heating or warming the cheese to at least 130° F., while stirring the cheese. Water is added to the cheese, and phase separation occurs to form an aqueous phase, a butterfat phase, and a cheese product phase. The butterfat phase and the aqueous phase may be separated by centrifuging. A cheese product remains, the cheese product having at least a portion of its fat removed and enough of the undesirable flavor removed so that the cheese has a consumer-acceptable flavor. For instance, a bitter flavor may be reduced by this method to a slight to very-slightly bitter flavor. The undesirable flavor components tend to be aqueous, and are thus removed from the cheese in the aqueous phase. The normally-present mesophilic bacteria are deactivated by the temperature used in fractionating the cheese. Further aspects of the invention will be apparent from the drawings and description of the preferred embodiments detailed below.

DETAILED DESCRIPTION OF THE DRAWINGS AND PRESENTLY PREFERRED EMBODIMENTS

Figure 1:
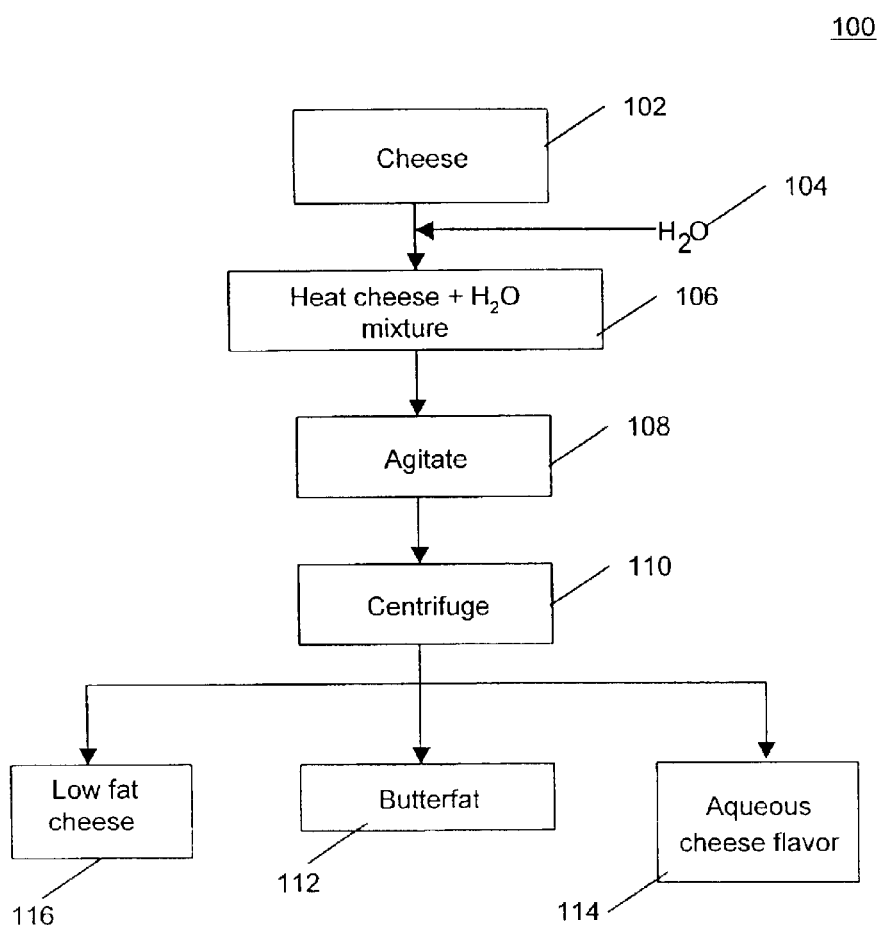
FIG. 1 is a flow chart for a process of cheese fractionation according to the present invention.

Fat content herein is expressed as a percentage on a "wet fat" basis, unless the fat is reported as a percentage of dry material (FDM). FIG. 1 is a flow chart for an improved process 100 for making cheese with lower fat content. In one embodiment, a cheese is made from whole milk via the conventional process described above. A quantity of this cheese is placed into a vessel, preferably equipped with at least a mixer or agitator. The cheese is desirably shredded or otherwise reduced in size 102 at this point so that intimate mixing may take place. Water may be added 104 at the same time or may be added before or after the cheese, in a quantity from about 1 part of water to 100 parts of cheese to about 1 part of water per 1 part of cheese. Water aids in the separation process, but if no water is added, moisture in the cheese still forms an aqueous phase. The cheese and water is warmed 106 and stirred or agitated 108. It is not necessary to introduce high-shear mixing, since the object of the stirring is simply the mixing of the cheese and water. High-shear mixing in this context will be counter-productive, since the object of adding water, stirring and heating is to break the natural emulsion in the cheese. After agitation or stirring at a temperature of at least about 130° F., a discontinuous semi-fluid mass appears with protein and fat suspended in the aqueous solution and the cheese is ready for separation into three phases. The length of time for heating and mixing depend on the age and composition of the cheese. The cheese is centrifuged 110 to separate out phases of butterfat 112 and an aqueous phase having cheese flavor components 114. What remains is a low fat cheese product 116. While centrifugation speeds up the process, the phases will separate into layers if allowed to stand.

Aqueous cheese flavor components produced by this process may be used to impart a genuine, complex, and authentic cheese flavor to many other products. Because of the nature of the present process, the cheese flavor product is separated even from the fat normally associated with the cheese product. The process of this invention is capable of extracting flavor even from Swiss, Cheddar and Parmesan cheeses, all highly desirable. The cheese flavor products may be added to foods including, but not limited to, any food product to which a cheese flavor may desirably be added.

In one example, 454 grams of a Cheddar cheese was shredded and adding to a mixing vessel with 45 grams of water. The cheese and water were heated via microwave with intermittent mixing to 170° F. The cheese became completely molten, and portions were drawn off for centrifugation. A laboratory centrifuge separated the cheese for one minute at 3500 rpm, equivalent to a force of about 1190 g (1190 times the force of natural gravity). A layer of liquid butterfat and aqueous material separated and was decanted. The material remaining was low fat cheese, with less than 3 grams fat per 50 grams cheese. One suitable centrifuge used in this work was a model IEC Centra CL-2 centrifuge with rotor #801 (6-place, 45° fixed angle), made by International Equipment Co., Needham Heights, Mass. Microwave ovens were used to heat the cheese and water mixtures in a glass beaker. The microwave oven used was model JE2851H001, manufactured by General Electric Co., Louisville, Ky.

The low fat cheese product 116 produced by the process of the invention may be used to make various process type cheeses. A process-type cheese is one in which an emulsifier is used to make a process-type cheese, such as sodium citrate or sodium phosphate. Process cheese which may be made using the low fat cheese product of the present invention include, but are not limited to, pasteurized process cheese, pasteurized process cheese food, and pasteurized process cheese spread. In addition, reduced-fat, light, and low-fat versions of these process type cheeses may also be prepared. Other types of process cheese products may also be prepared, such as pasteurized process cheese products and pasteurized process cheese prepared cheese products. These products include, but are not limited to, other non-standard cheeses and imitation cheeses.

It is not necessary that high centrifugal force be applied. Once the process of heating and stirring breaks the cheese emulsion, separation of the fat and aqueous phases proceeds readily. The centrifugal force may be applied by any number of centrifuge types. Batch processing is one method of practicing the invention. Other methods may also be used, including continuous processing with a decanting centrifuge or a cyclone separator, so long as the material has sufficient residence time in the agitation or stirring equipment for the emulsion to break and for the fat phase and aqueous phase to separate. Centrifugal force of about 10 g to about 150 g is sufficient. Greater force enables the separation to proceed faster. Forces of up to 1500 g to about 2000 g may be used to increase the speed and effect a better separation of fat from the cheese. In one embodiment of the invention, less g forces are used to extract and separate the components of the cheese. An imperfect separation or decantation may result in a mixture of butterfat 112 and aqueous cheese flavor 114. This mixture may be used as a dairy spread, a butter-like product, having a very desirable cheese flavor. An alternate process for producing such a dairy spread is presented in FIG. 13.

Figure 2:
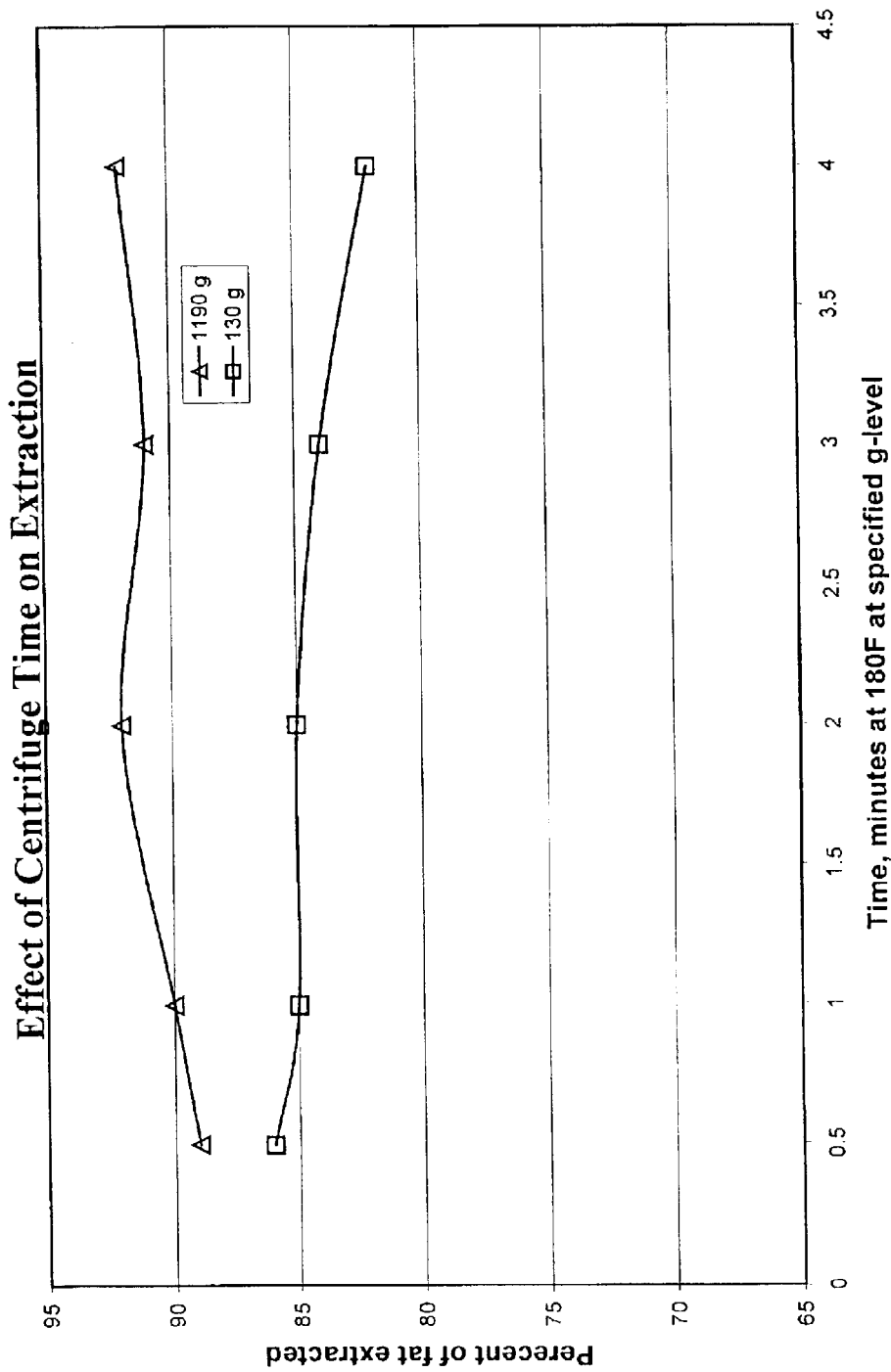
FIG. 2 is a graph depicting the effect of centrifuge time and g-force on fat extraction.

FIG. 2 depicts the effect of the centrifugal force and time on fat extraction from extra sharp New York Cheddar cheese. In these experiments, about 10 parts of water were added to about 90 parts of shredded cheese. The cheese had been heated to approximately 180° F., and portions were centrifuged for differing lengths of time. The graph of FIG. 2 makes it clear that once the emulsion of the cheese is broken, only modest centrifugal forces, as little as 130 g or less, are required to separate at least 85% of the fat from the cheese. Much higher forces, up to 1190 g, an order of magnitude increase, provide for greater separation, making a 90% fat reduction possible. This greater separation may be desirable for making a cheese with a "low fat" claim. Moreover, the centrifuging time need not be long. In fact, with the 130-g force, the best fat reduction was achieved with only 0.5 minutes of centrifuging.

Figure 3:
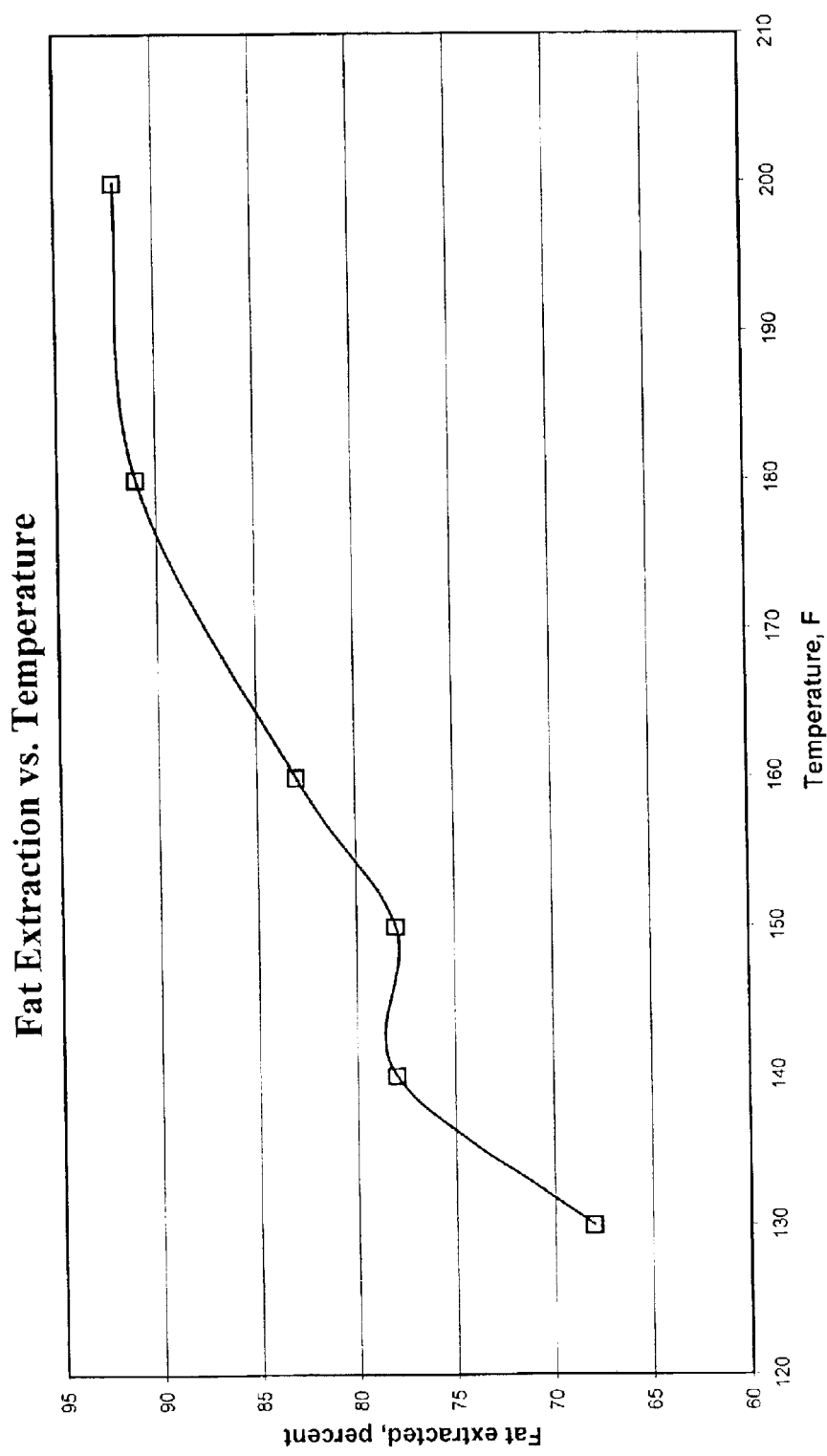
FIG. 3 is a graph depicting the effect of temperature on the process.

An important variable in practicing the method is the temperature to which the cheese mass is heated. FIG. 3 depicts a series of batch runs in which extra sharp New York Cheddar cheese was processed. These runs were made with cheese that had been aged for more than 2 years. About 10 parts of water were added to about 90 parts of shredded cheese, and the mix was heated to various temperatures. A centrifuge applied about a force of about 1190 g to each batch for about 3 minutes, and the percent of fat extracted was measured. This particular batch of extra sharp New York Cheddar had about 37% fat at the beginning of the experiments. As FIG. 3 shows, heating the mix from 130 to 200° F. made it possible to remove from about 67% to about 92% of the fat in the cheese.

Figure 4:
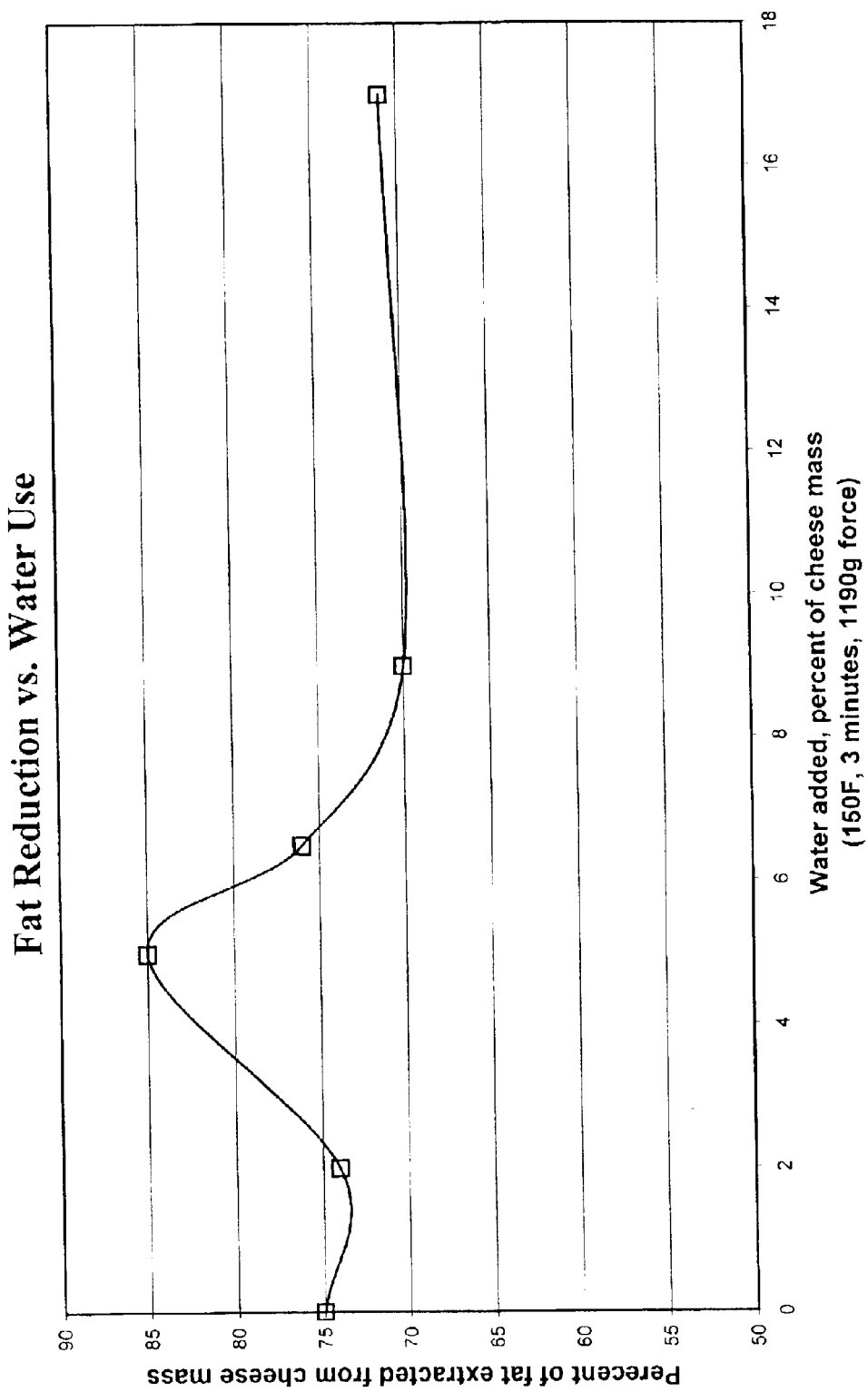
FIG. 4 is a graph depicting the effect of water on fat extraction.

FIG. 4 depicts the effect of water addition on the process at two different temperatures. FIG. 4 graphs the percent of fat extracted as a function of water addition on extra sharp New York Cheddar cheese. Shredded cheeses processed by the method of FIG. 1 had water added in varying amounts, from one to about 17 percent by weight of the cheese. The mix was heated and stirred at 150° F., and then centrifuged for about 3 minutes at 1190 g force. In these experiments, adding about 5 percent water had the best result, removing about 85% of the fat originally in the cheese. This corresponds to about 1 part of water to about 19 parts of cheese.

Figure 5:
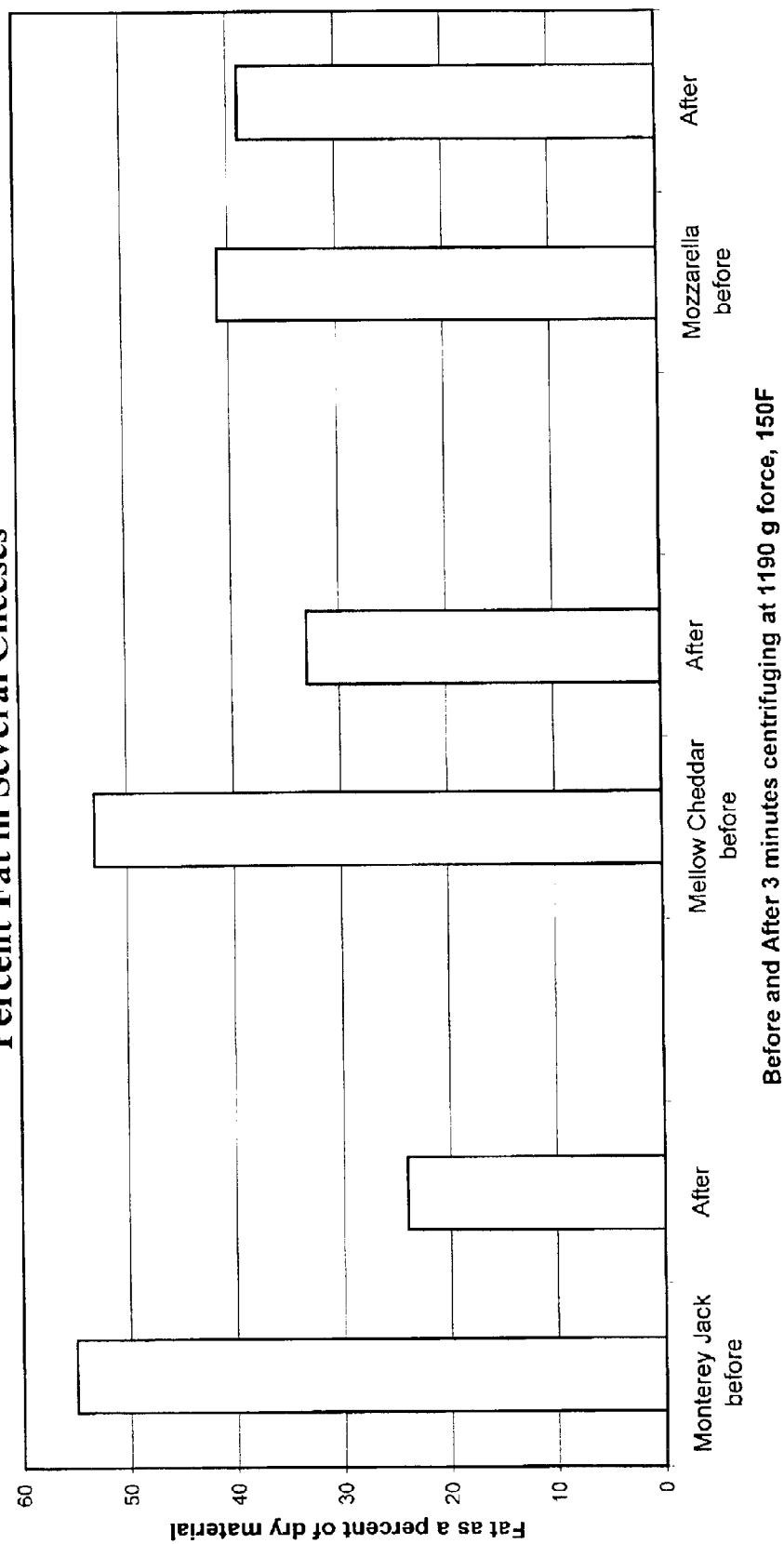
FIG. 5 is a graph showing the fat reduction accomplished using different cheeses.

Not all cheeses are susceptible of removing 90% of their fat content. FIG. 5 depicts three cheeses that were processed by according to the process of FIG. 1. The fat remaining as a percentage of dry material (% FDM) reveals substantial reductions in Monterey Jack cheese and mellow Cheddar cheese. However, the Mozzarella cheese used in these experiments showed only a marginal reduction in fat. This particular Mozzarella was aged for about 3 months, and was processed at about 150° F. Centrifuging was for 3 minutes at 1190 g. There was an incomplete break in the emulsion of this cheese during the process. Thus, the process works best with cheeses whose natural emulsion breaks under the influence of warming and stirring, preferably with 5% to 50% water by weight of the cheese added during the warming and stirring. Higher temperatures, to 170° F. to 190° F., and preferably to about 180° F., would have aided in extracting more fat. Cheese made via an ultrafiltration process, as disclosed in U.S. Pats. No. 5,330,780, 5,356,639, and 5,356,640, may also have its fat level lowered with the processes of the present invention.

Cheeses from which fat may be extracted by the process include hard cheese, soft cheese, semi-soft cheese, and part-skim cheese. Specific examples include Asiago cheese, blue cheese, brick cheese, club cheese, cold pack cheese food, cold pack cheese, Mozzarella cheese, Muenster cheese, Romano cheese, string cheese, and Provolone cheese, as well as a variety of other cheeses.

Figure 6:
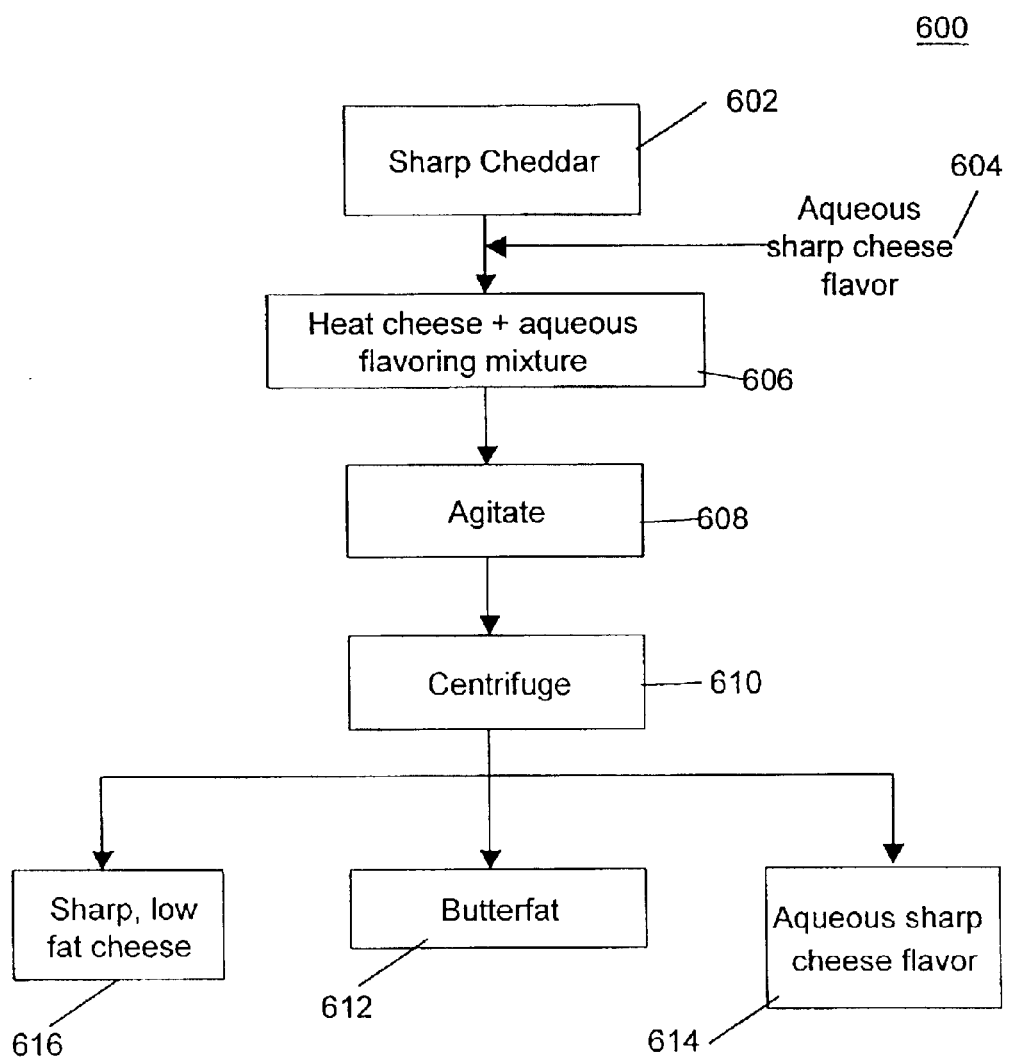
FIG. 6 is a flow chart for a process for manufacturing a low fat cheese and for extracting a cheese flavor.

Another method of practicing the invention is shown in FIG. 6, which depicts a process 600 for manufacturing a low fat cheese and for extracting cheese flavor. In this method, shredded sharp Cheddar cheese 602 is placed into a vessel. The cheese and any water added are heated 606 to a temperature from about 170° F. to about 190° F. Cheese flavor, which has been extracted from a previous separation process, may be added back 604 prior to or during the heating and agitation, in lieu of water. It should be noted that many of the flavor components associated with cheese are water soluble, and tend to separate into the aqueous phase that forms when the emulsion of the cheese breaks. However, not all of the flavor components migrate to the aqueous phase. Therefore, this process may be used to enhance the flavor of the cheese by first removing some of the flavor (and much of the fat) in a first run, and also adding flavor 604 at the early stages of the process. The components are heated 606 while stirring 608, along with any additional water that may be added at this point. The cheese emulsion breaks under the influence of agitation and heating. The mixture is then subjected to centrifugal force 610, and the phases separate into a butterfat layer 612 and an aqueous layer 614 that contains at least some of the flavor components of the cheese. The remainder is a low-fat sharp New York Cheddar cheese 616. The aqueous layer may be used as a cheese flavor ingredient for other foods, such as snack items or cheese flavoring for cooking.

Figure 7:
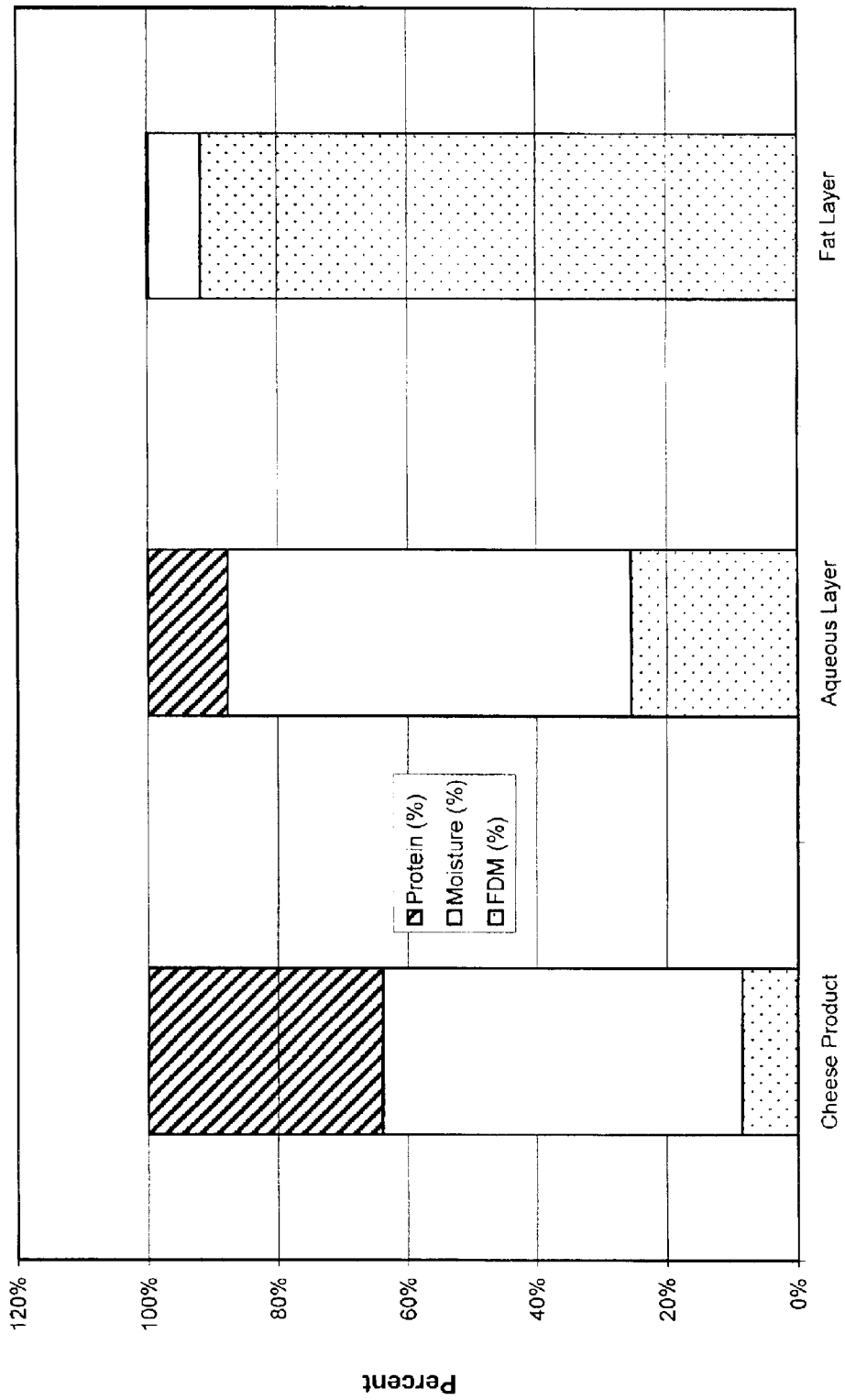
FIG. 7 is a graph of results for fractionation of a New York Cheddar cheese.

FIG. 7 depicts the results of one experiment using New York extra sharp Cheddar cheese. About 227 grams 2-year old New York extra sharp Cheddar and 25 grams water were shredded and placed into a beaker. The mixture was heated in a microwave oven over about 1.5 minutes to about 140–150° F., with occasional stirring. The heated mixture was then centrifuged for about 3 minutes at 4000 rpm. The mixtures were separated and analyzed, with results as shown in FIG. 7. Because of the method of calculating fat as a percentage of dry material (FDM), the results will not necessarily add to 100%. About 96% of the protein was recovered in this experiment.

Figure 8:
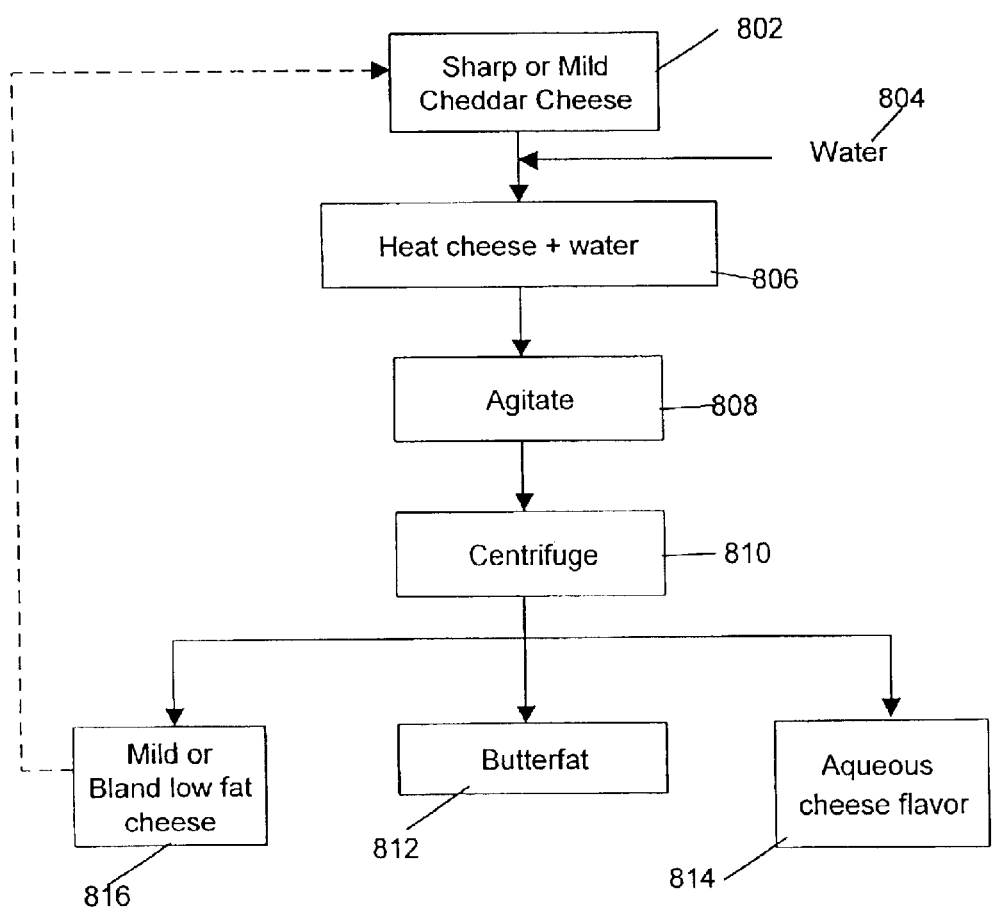
FIG. 8 is a flow chart for a process for making mild or bland cheese.

Another method of practicing the invention is shown in FIG. 8, which depicts a process 800 for removing cheese flavor. In this method, shredded sharp Cheddar cheese 802 is placed into a vessel. Water is added 804. The cheese and water are heated 806 to a temperature from about 170° F. to about 190° F. The components are heated 806 while stirring 808. The emulsion of the cheese breaks under the influence of agitation and heating. The mixture is then subjected to centrifugal force 810, and the phases are separated into a butterfat layer 812 and an aqueous layer 814 that contains at least some of the flavor components of the cheese. The remainder is a mild low-fat New York Cheddar cheese 816. The aqueous layer 814 may be used as a cheese flavor ingredient for other foods. If a bland cheese is desired, the mild cheese 816 may be size-reduced and the process repeated using the mild cheese. Alternatively, the mild cheese may be re-melted and the process repeated from step 806. The end result is a bland cheese product with a lower fat content.

Figure 9:
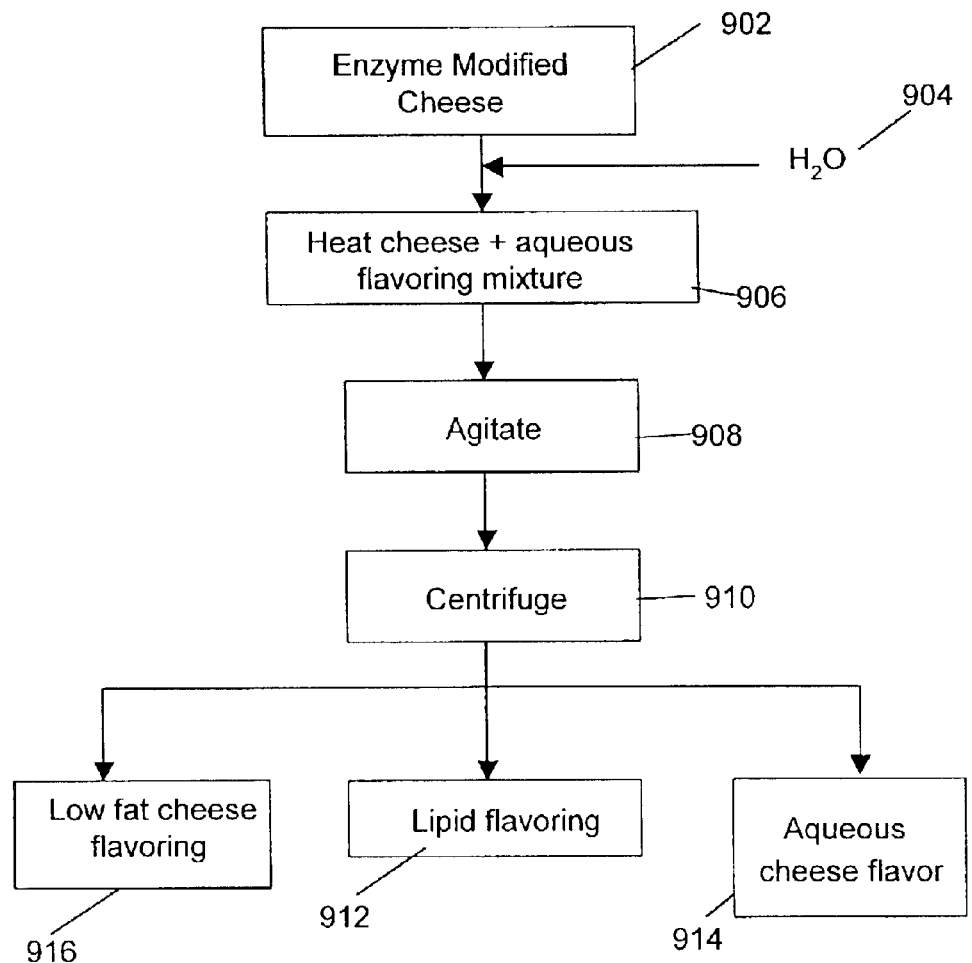
FIG. 9 is a flow chart for a process for cheese flavor extraction.

FIG. 9 shows another method for reducing fat and providing a cheese flavor component. In this process 900, an enzyme-modified cheese (EMC) is reduced in fat and some of its flavor is extracted. Enzyme-modified cheese is a non-standard of identity cheese typically produced by combining natural cheese of different ages and varieties with emulsifiers, water, salt, milkfat, and exogenous proteolytic and/or lipolytic enzymes. The blended mass is heated and incubated to allow production of desired flavor characteristics. After incubation, the enzymes are heat deactivated and the EMC is packaged and cooled. The finished enzyme-modified cheese can be in a range of moisture levels, from 60–70% moisture (slurry) to 15–20% moisture.

In one embodiment of the method, enzyme-modified cheese is shredded 902 and added to a vessel. EMC is primarily of interest because it has a high level of cheese flavor components. Water may be added 904 in amounts sufficient to aid the process. The resulting mixture is then heated 906 and stirred 908, causing the emulsion of the cheese to break. The mixture is then subjected to centrifugation 910. Because of the intense flavor produced in enzyme-modified cheese, some cheese flavor will remain in the upper butterfat or lipid layer 912, while a good portion of the flavor components will migrate to the aqueous layer 914, which may be used as a cheese flavoring product. The remaining cheese product phase may also be used as a low-fat or reduced fat cheese flavoring 916. All three layers or phases may be used (separately) as a cheese flavoring.

Figure 10:
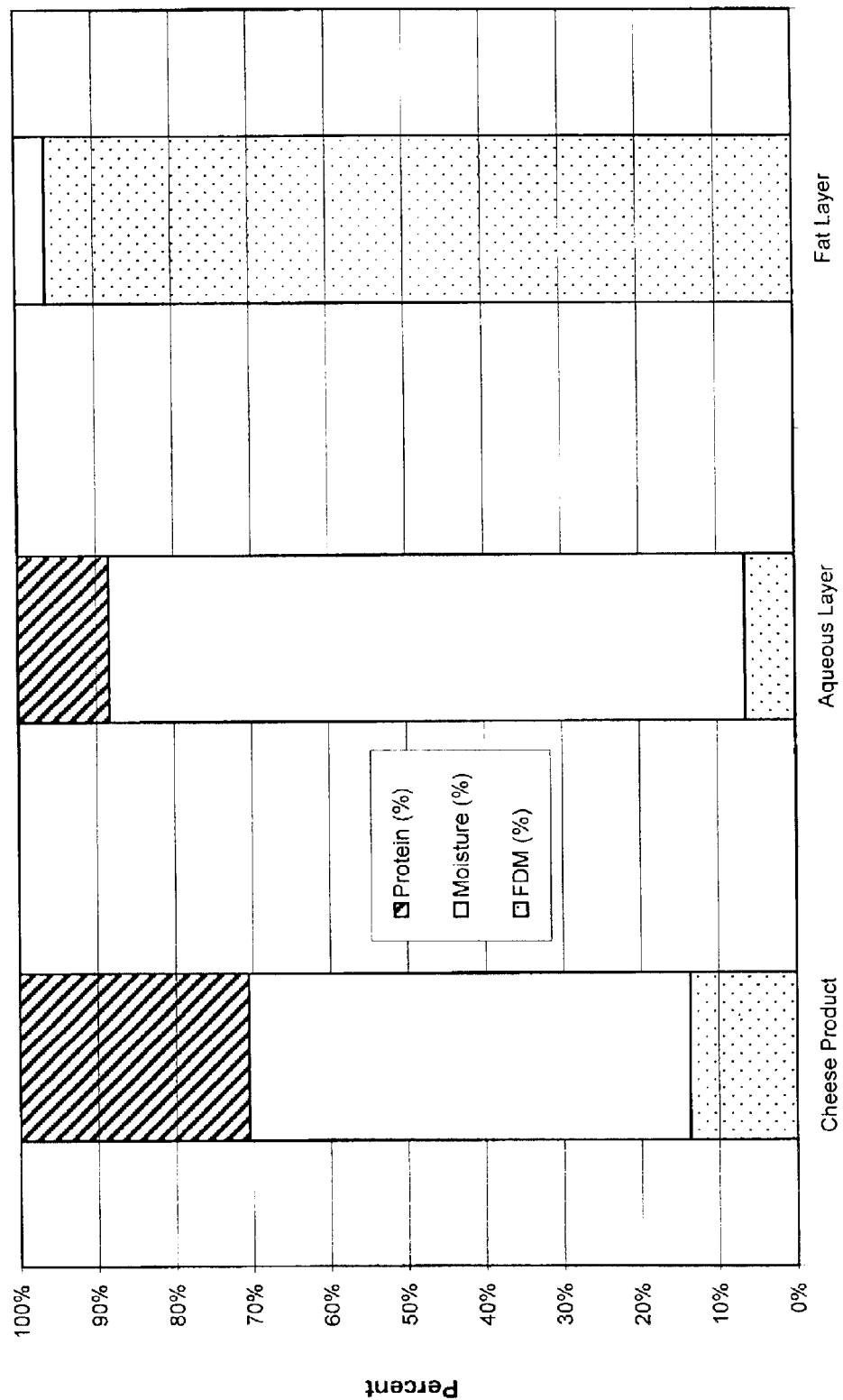
FIG. 10 is a graph for results of fractionation of an EMC cheese.

FIG. 10 depicts results of an experiment very similar to that of FIG. 7, but this time with an EMC cheese. The cheese product resulting from fractionation of the EMC had about 13% fat FDM, compared to about 8% in the New York Cheddar cheese from FIG. 7, suggestive of a stronger flavor. The EMC-fractionated aqueous layer had about 6% FDM, compared to about 29% for the New York Cheddar cheese in FIG. 7. The results may not add to 100% because of the use of the FDM metric. Virtually all of the protein was recovered in these tests.

Figure 11:
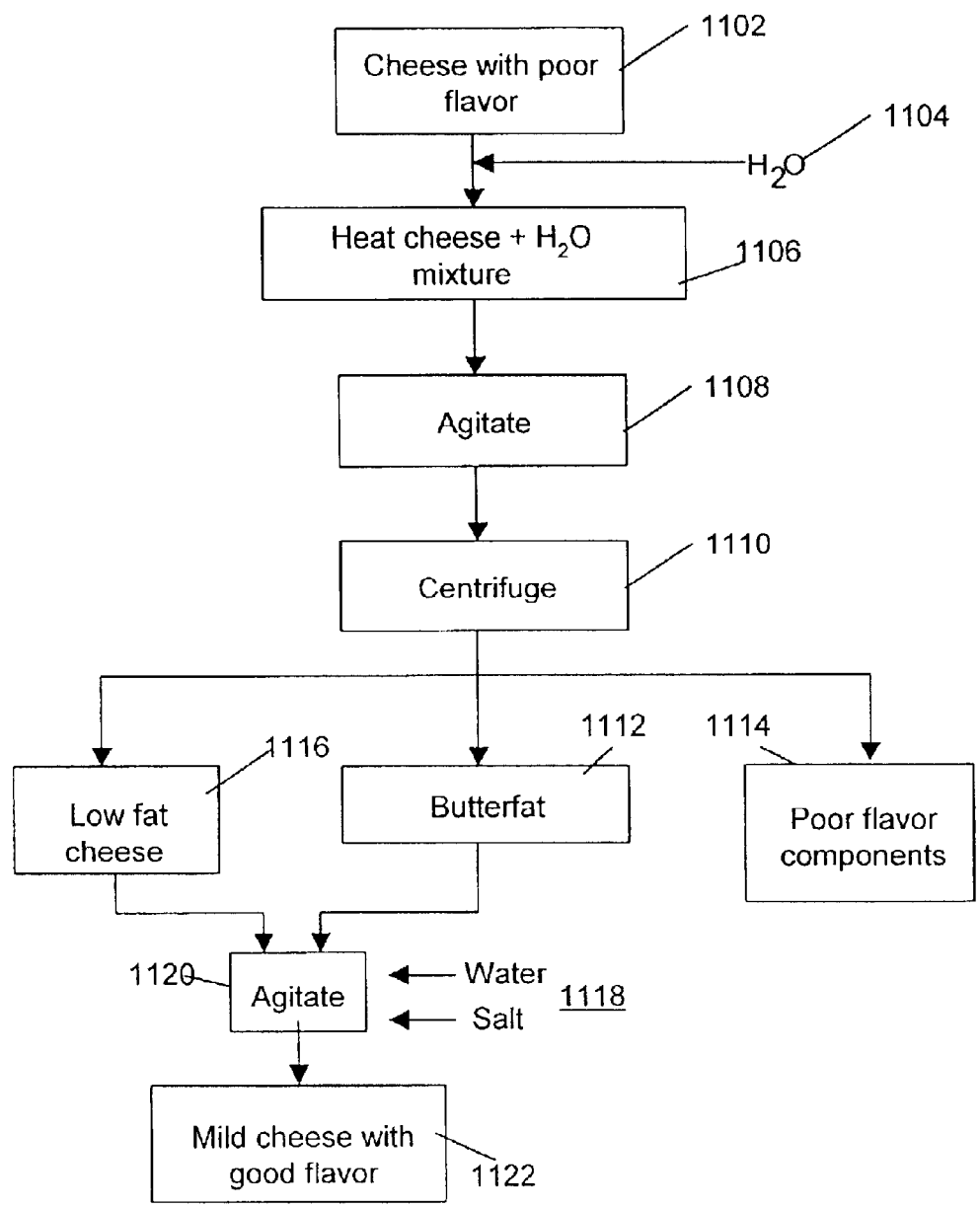
FIG. 11 is a flow chart for a process of removing undesirable flavors.

There are other ways to practice the invention. As mentioned above, cheese may have an undesirable flavor. This undesirable flavor may take many forms, including bitter tastes, metallic tastes, flat tastes, barny tastes, utensil-like tastes, acid, fruity or whey-taint tastes, rancid tastes, or even meaty or brothy flavors. The components that yield such tastes tend to be water-soluble. FIG. 11 depicts a method for using the process not only to remove fat, but also to remove undesirable flavors. The method 1100 includes providing a poor flavor cheese with reduced size 1102. A consumer or taste panel may determine the flavor. A cheese having an undesirable flavor may be graded from among the grades of "definite," "pronounced," "slight," or "very slight," or no bitter taste. An amount of water may be added 1104 to assist the process. The cheese and water mixture 1106 is heated, preferably to a temperature from about 170° F. to about 190° F. The cheese is stirred or agitated while heating 1108. The emulsion of the cheese breaks during this process of heating and stirring, and the cheese is ready for separation. The cheese is then centrifuged 1110. The centrifugation process yields a fat phase 1112, and an aqueous phase 1114. What remains is a cheese having a lower fat content 1116, from which a substantial portion of the undesirable taste has been removed. A substantial portion of the undesirable taste has been removed if a cheese having a "definite" or "pronounced" flavor has been improved to a grade of "slight" or "very slight" bitter flavor, or if no bitter flavor at all remains. A substantial portion of the undesirable flavor may be said to have been removed if a cheese graded as "slight" improves to "very slight," or if no bitter taste remains.

Additional optional steps are also shown in FIG. 11. These include adding ingredients 1118 to the cheese while stirring 1120. These added ingredients may be any additives desired to enhance any of the nutritional, taste, or handling qualities of the cheese. For instance, as shown in FIG. 11, salt or water may be added to modify the texture or feel of the cheese. Other additives may include sodium citrate or any of a variety of sodium phosphate type salts traditionally used in process cheese making. Other ingredients common to process cheese may also be added to cheese made by this fractionating process. Such additives include, but are not limited to, nonfat dry milk solids, whey, milk proteins, sugars, gums, starches, various fillers and extenders, and vitamins and minerals. The result is preferably a fortified cheese 1122 from which the undesirable flavor components and fat have been removed, and to which desirable ingredients have been added. This process may increase the value of the product to the consumer, and may result in a low fat cheese.

Figure 12:
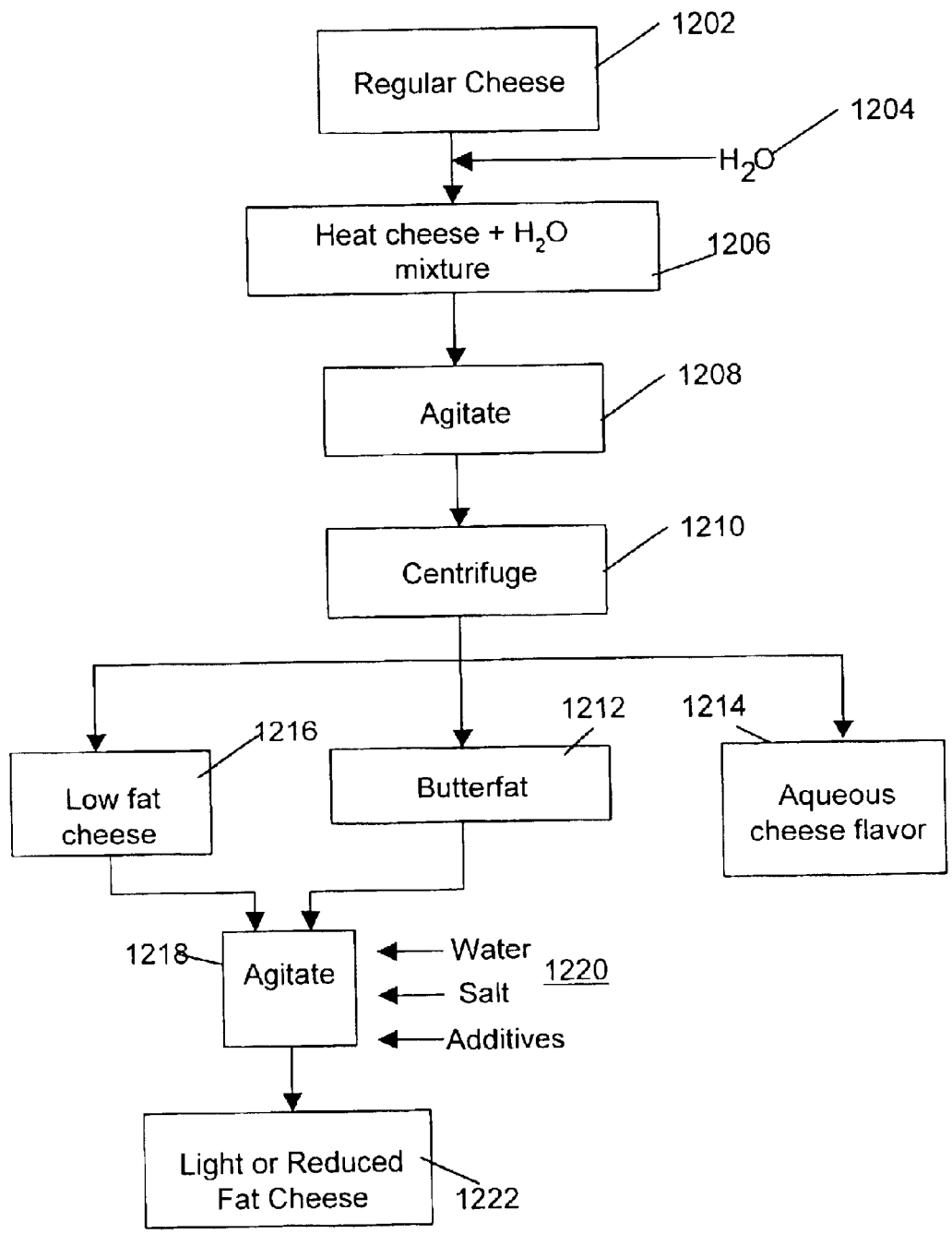
FIG. 12 is a flow chart for a process of manufacturing light or reduced fat cheese.

The consumer may not always prefer a low fat cheese, that is, a cheese having no more than about 3 grams fat per 50 gram cheese serving. A consumer may prefer a cheese with higher fat content, and thus better texture and mouth feel than a low fat cheese. FIG. 12 is an alternate process 1200 by which a cheese producer may reduce the undesirable components in cheese and yet produce a light cheese (50% less fat) or a reduced-fat cheese (25% less fat). The process includes providing a cheese and reducing the cheese in size, as by shredding the cheese 1202. Water may be added 1204 and the cheese and water mix 1206 heated in a vessel while stirring or agitating 1208. After the cheese emulsion breaks, the cheese may be subjected to centrifugation 1210.

The centrifugation produces a phase of butterfat 1212, an aqueous phase 1214 containing at least some of the cheese flavor components, and a low-fat cheese product 1216. The low fat cheese product 1216 may then be stirred or agitated 1218 while ingredients 1220 are added as desired. These ingredients may include water, salt or other nutrients as discussed above, or may also include a measured amount of butterfat 1212. By practicing this method, a user may eliminate undesirable flavor components in the aqueous phase 1214, and then add back in a known, controlled amount of butterfat 1212. The user thus controls the content, flavor, texture and nutritional content of the cheese in a predictable manner.

Figure 13:
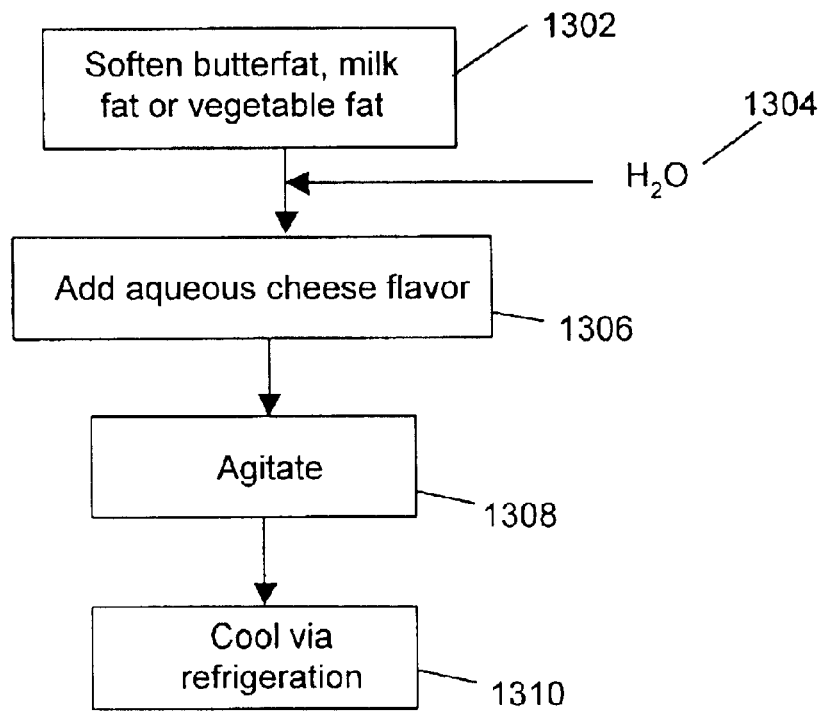
FIG. 13 is a flow chart for a process of manufacturing a cheese-flavored dairy spread.

FIG. 13 presents another way to practice another aspect of the invention, to produce a cheese-flavored dairy spread. This process, in a manner similar to that depicted in FIG. 1, has a minimal number of steps, thus keeping costs and processing variables within control. This method of practicing the invention is a process 1300 for producing a cheese-flavored dairy spread 1300. The method comprises the steps of taking butterfat or milk fat and softening or melting it 1302, preferably by heating gently at a temperature from 60° F. to 90° F. To the softened butterfat or milkfat is then added aqueous cheese flavor component 1306. Other ingredients may also be added, such as water 1304 for viscosity control. The ingredients are then stirred or agitated 1308 before cooling 1310, preferably by separation into blocks and being placed into a refrigeration process. The resulting dairy spread may be used in the same manner as other dairy spreads or butters. The cheese-flavored dairy spread may be used to prepare sandwiches, pastries, baked goods, as a topping for vegetables, and so on. If a non-dairy spread is desired, vegetable fat may be substituted for the butterfat. The method would then mix the vegetable fat with the cheese flavor component to form a non-dairy spread.

TABLE 1

| Cheese Type | Moisture, Max. % | Legal Min. Fat % | Reduced Fat % | Light Fat % | Low Fat % |
|---|---|---|---|---|---|
| American Cheese | 39 | 30 | 22.5 | 15 | 6 |
| Cheddar Cheese | 39 | 30 | 22.5 | 15 | 6 |
| Colby Cheese | 40 | 30 | 22.5 | 15 | 6 |
| Colby Jack Cheese | 42 | 30 | 22.5 | 15 | 6 |
| Edam Cheese | 45 | 22 | 16.5 | 11 | 6 |
| Gouda Cheese | 45 | 25 | 19 | 12.5 | 6 |
| Monterey Jack | 44 | 28 | 21 | 14 | 6 |
| Mozzarella Cheese | 60 | 18 | 13.5 | 9 | 6 |
| Part skim Mozzarella Cheese | 60 | 12 | 9 | 6 | 6 |
| Low moisture Mozzarella Cheese | 52 | 21.6 | 16.2 | 11 | 6 |
| Low Moisture, part skim Mozzarella Cheese | 52 | 14.4 | 10.8 | 7.2 | 6 |
| Muenster Cheese | 46 | 27 | 20.3 | 13.5 | 6 |
| Parmesan Cheese | 32 | 22 | 16.5 | 11 | 6 |
| Provolone Cheese | 45 | 24.75 | 18.5 | 12.4 | 6 |
| Swiss Cheese | 41 | 25 | 19 | 12.5 | 6 |
| Stirred-Curd Cheese | 39 | 30 | 22.5 | 15 | 6 |
| Wash Curd Cheese | 40 | 30 | 22.5 | 15 | 6 |

Table 1 above depicts a variety of cheeses, along with their maximum moisture and legal minimum fat contents on a "wet fat" basis (see 21 C.F.R., sections referred to above). After the fractionation process is used to produce lower fat cheese, the fat content is targeted for the percentage in the last three columns of Table 1. Table 1 is not intended to be an exhaustive list of all cheeses that may be fractionated to produce a lowered fat cheese, or of all possible levels of fat content in a lowered fat cheese. One cheese with lower fat, referred to as "reduced fat," as discussed above, has at least 25% of its fat content removed. Other cheese, "light" cheese, may have 50% of its fat content removed. Still other cheese may be low fat cheese, wherein less than 10% of the product is fat content. In cheese having a lower fat content, the moisture may rise above its normal maximum, and may be as high as about 55%. In "light cheese," the moisture content may be as high as about 60%. In low fat cheese, the moisture content may be as high as about 65%. The moisture content of the Mozzarella cheese made according to this process may be even higher.

There are other ways to practice the invention. Once the emulsion of the cheese has broken, the butterfat and the aqueous phases may be separated by a variety of ways. Centrifuging is believed to be merely the most convenient, quickest and least expensive way to accomplish this task. Other ways, however, may be used, such as decanting or gravity settling, and filtration. These techniques suffer only by comparison with centrifuging, since any of these techniques will accomplish the separation of a fat phase from an aqueous phase, and the separation of an aqueous phase from a cheese-product phase.

A large number of consumers desire to modify their consumption of certain fatty acids. As compared to milk fat, vegetable fats have different nutritional qualities and typically are of lower cost. As part of the invention, the aqueous layer and/or cheese product layers may be combined with vegetable fat to produce various cheese products or cheese flavorings with different nutritional attributes and likely at a lower cost to consumers.

EXAMPLE 1

An extra-sharp New York Cheddar cheese with a composition of 37% moisture and 34% fat was processed according to the process of the invention. 9% water by weight was added to a shredded amount of the cheese, and the cheese and water were warmed to about 150° F. The mixture was then centrifuged at about 1190 g force for 3 minutes. This process extracted about 70% of the fat in the cheese. The final composition of the cheese was 8% fat (FDM), 52% moisture, and 34% protein.

EXAMPLE 2

2-month old Monterey Jack cheese having 28% fat was shredded and stirred at about 150° F. The starting cheese had about 56% fat as a percentage of dry material. After centrifuging for 3 minutes at about 1190 g force, fat as a percentage of dry material dropped to about 24%.

As noted above, there are many ways to practice this invention. Cheese is provided, preferably in a size-reduced form, such as shredded cheese. However, other forms may be used, such as milled cheese, ground cheese, or cheese in a powdered form. What is important is that heat transfer into the cheese is readily accomplished, and that mass transfer of the components of the broken emulsion out of the remaining cheese product is also readily accomplished. These transport phenomena occur more readily in particles and bodies of small size, rather than particles or masses of large size. The manner in which the smaller masses are formed may be varied, but shredding or grinding is preferred.

The cheese of reduced size is added to a vessel and stirred or agitated. It is not necessary that high-shear mixing be employed, because the process is intended to separate materials, not to mix materials, after the addition of any water at the outset. High-shear mixing would likely be counter-productive. In laboratory experiments, intermittent hand mixing was sufficient to blend water with cheese, and also was sufficient to contact the cheese with the walls of the vessel, and then remove the cheese from the walls of the vessel, for heat transfer. If it is desired to produce a low fat cheese without extraction of the flavor components, the aqueous flavoring from a previous extraction may be added to the cheese in lieu of water; alternatively, to produce a bland cheese, the cheese product produced by one application of the process may be re-reduced in size, and re-fractionated with an additional portion or water, to remove more of the flavor.

The cheese, and any water added, is heated. In the laboratory, microwave-heating techniques sufficed. In production processes, vessels that are heated electrically, by steam, or by a controlled technique are sufficient. It is important that the heat addition and the temperature of the cheese mass be controlled. Stirring is used to evenly disperse the heat through the cheese and also to disperse and mix any water added. The cheese product made by this process has an improved texture and feel to a consumer compared to current low-fat cheese on the market. Mesophilic culture bacteria typical of many cheese varieties is inactivated by the temperatures used to fractionate the cheese. Consequently, the lower fat cheese produced from this process should not age, but should be stable in terms of flavor and body. Cheeses that contain thermophilic starter cultures may continue to age in terms of flavor and texture depending upon the sensitivity of the organism to the temperature used for the fractionation process. Accordingly, it is the intention of the applicants to protect all variations and modifications within the valid scope of the present invention. It is intended that the invention be defined by the following claims, including all equivalents.

What is claimed is:

1. A method of fractionating cheese, comprising:
   a) providing cheese;
   b) warming the cheese to at least 130° F. and stirring the cheese to form an aqueous phase, a butterfat phase, and a cheese product; and
   c) separating the phases, wherein the cheese product is selected from the group consisting of low fat cheese, light cheese and reduced fat cheese.

2. The method of claim 1 further comprising adding water while the cheese is warmed and stirred.

3. The method of claim 1 further comprising adding butterfat or vegetable fat to the cheese product.

4. The method of claim 1 wherein separating the phases is accomplished by centrifuging the cheese after said cheese has been warmed and stirred.

5. The method of claim 1 wherein the cheese is warmed to a temperature of from about 140° F. to about 210° F.

6. The method of claim 1 wherein the cheese is warmed to a temperature of from about 170° F. to about 190° F.

7. The method of claim 2 wherein the water is added to the cheese in a weight ratio of from about 1 part water to 100 parts of cheese, to about 1 part of water to 1 part of cheese.

8. The method of claim 2 wherein the water is added to the cheese in a weight ratio of from about 1 part water to 19 parts of cheese, to about 1 part water to about 9 parts of cheese.

9. The method of claim 4 wherein the cheese is centrifuged at a force of from about 10 g about 2000 g.

10. The method of claim 4 wherein a centrifugal force is applied for a time period of from about 0.1 minutes to about 10 minutes.

11. The method of claim 1 wherein the cheese provided is selected from the group consisting of enzyme-modified cheese, hard cheese, soft cheese, semi-soft cheese, and part-skim cheese.

12. The method of claim 1 wherein the cheese provided is selected from the group consisting of cold pack cheese food, cold-pack cheese, and club cheese.

13. The method of claim 1 wherein the cheese provided is selected from the group consisting of Asiago cheese, blue cheese, brick cheese, Swiss cheese, Edam cheese, Gouda cheese, Muenster cheese, Mozzarella cheese, Parmesan cheese, Provolone cheese, Romano cheese, American cheese, Cheddar cheese, Colby cheese, Monterey Jack cheese, wash curd cheese and stirred curd cheese.

14. The method of claim 1 further comprising adding an aqueous phase from a previous processing sequence to the cheese prior to or while warming and stirring.

15. The method of claim 1 further comprising providing at least one ingredient selected from the group consisting of butterfat, vegetable fat, salt, and additives and blending the at least one ingredient with the cheese product to produce a fortified cheese.

16. The method of claim 15 further comprising providing water and blending the water and the at least one ingredient with the cheese product to produce a fortified cheese.

17. The method of claim 1 further comprising reducing the cheese in size prior to stirring by a method selected from the group consisting of milling, grinding, dicing, cubing, slicing, chopping and shredding.

18. A method of manufacturing cheese with a reduced fat content, the method comprising:
    a) providing cheese containing fat;
    b) warming the cheese to at least 150° F. and stirring the cheese to form an aqueous phase, a butterfat phase, and a cheese product;
    c) separating the phases, wherein a cheese product remains, said cheese product having at least a portion of said fat removed;
    d) providing at least one ingredient selected from the group consisting of water, butterfat, salt, and nutrients; and
    e) blending the at least one ingredient with the cheese product to form said cheese with reduced fat content.

19. The method of claim 18 further comprising removing water from the aqueous phase for use as a cheese flavoring product.

20. The method of claim 18 further comprising adding an aqueous phase from a previous processing sequence to the cheese prior to or while warming and stirring.

21. A method of extracting undesirable flavors in cheese, the method comprising:
    a) providing cheese containing fat and having an undesirable flavor;
    b) warming the cheese to at least 130° F. and stirring the cheese;
    c) adding water to the cheese before or while warming the cheese;
    d) forming an aqueous phase, a butterfat phase, and a cheese product; and
    e) separating the phases by centrifuging, wherein a cheese product remains, said cheese product having at least a portion of said fat and a substantial portion of said undesirable flavor removed.

22. The method of claim 21 further comprising blending the cheese product with at least one ingredient selected from the group consisting of water, butterfat, vegetable fat, salt, and nutrients.

23. The method of claim 21 wherein the cheese is warmed to a temperature of from about 140° F. to about 212° F.

24. The method of claim 21 wherein the cheese is warmed to a temperature of from about 165° F. to about 190° F.

25. The method of claim 21 wherein the water is added to the cheese in a weight ratio of from 1 part of water to 100 parts of cheese, to about 1 part of water to 1 part of cheese.

26. The method of claim 21 wherein the water is added to the cheese in a weight ratio of from 1 part of water to 19 parts of cheese, to about 1 part of water to 9 parts of cheese.

27. The method of claim 21 wherein said cheese is centrifuged at a force of from about 10 g to about 2000 g.

28. The method of claim 27 wherein a centrifugal force is applied for a time period of from about 0.1 minutes to about 10 minutes.

29. The method of claim 21 wherein steps b) through e) are repeated on the cheese product to further reduce a flavor of the cheese to make a bland cheese product.

30. The method of claim 21 wherein fat extracted from the cheese is added back to the cheese product to produce a full fat cheese.

31. A method of manufacturing a cheese flavor product, the method comprising:
    a) providing an enzyme-modified cheese;
    b) warming the cheese to at least 130° F. and stirring the cheese to form an aqueous phase, a butterfat phase, and a cheese product; and
    c) separating the phases by centrifuging, wherein both the aqueous phase and the cheese product constitute cheese flavor products.

32. The method of claim 31 further comprising adding water prior to or during warming and stirring.

33. The method of claim 31 wherein the cheese is warmed to a temperature of from about 140° F. to about 212° F.

34. The method of claim 31 wherein the water is added to the cheese in a weight ratio of from about 1 part water to 100 parts of cheese, to about 1 part of water to 1 part of cheese.

35. A method of making a cheese-flavored spread, the method comprising:
    a) fractionating a cheese by warming the cheese to at least 130° F. and stirring the cheese to form an aqueous phase, a butterfat phase, and a cheese product; and
    b) mixing the aqueous phase with a fat to produce a cheese-flavored spread.

36. The method of claim 35 wherein the fat mixed with the aqueous phase is butterfat, producing a cheese-flavored dairy spread.

37. The method of claim 35 wherein the fat mixed with the aqueous phase is vegetable fat, producing a cheese-flavored non-dairy spread.

38. The method of claim 36 further comprising softening or melting the fat phase by warming before mixing with the aqueous phase.

39. The method of claim 35 wherein fractionating the cheese is accomplished by centrifuging at a force of from about 10 g to about 2000 g.

40. The method of claim 35 further comprising adding water to the cheese in a weight ratio of from about 1 part water to 100 parts of cheese, to about 1 part of water to 1 part of cheese.

* * * * *